United States Patent
Wan et al.

(10) Patent No.: US 8,647,457 B2
(45) Date of Patent: Feb. 11, 2014

(54) METHOD OF MANUFACTURING RUBBER LINED COMPOSITE PRESSURE VESSELS

(75) Inventors: Jui-Hua Wan, Taoyuan County (TW); Sheng-Hsiung Yeh, Taoyuan County (TW); Cheng-Huan Wang, Taoyuan County (TW); Chung-yi Chu, Taoyuan County (TW); Dar-ping Juang, Taoyuan County (TW); Hsien-Jung Chiu, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 378 days.

(21) Appl. No.: 13/192,915

(22) Filed: Jul. 28, 2011

(65) Prior Publication Data

US 2013/0025775 A1 Jan. 31, 2013

(51) Int. Cl.
*B29C 65/02* (2006.01)

(52) U.S. Cl.
USPC .......................................... 156/166; 156/245

(58) Field of Classification Search
USPC ................................................ 156/166, 245
See application file for complete search history.

(56) References Cited

U.S. PATENT DOCUMENTS

| 4,760,949 | A | 8/1988 | Elias |
| 5,942,070 | A * | 8/1999 | Park et al. ..................... 156/173 |
| 5,979,692 | A | 11/1999 | West |
| 6,510,674 | B1 | 1/2003 | Case |
| 7,208,207 | B2 | 4/2007 | Ono et al. |

* cited by examiner

*Primary Examiner* — Michael Orlando
*Assistant Examiner* — Daniel Lee
(74) *Attorney, Agent, or Firm* — Jackson IPG PLLC

(57) ABSTRACT

Disclosed is a method for making a rubber liner of a composite pressure vessel. At first, rubber is located in a mold. The rubber and the mold are located in a vacuum bag, heated and pressed so that the rubber is vulcanized and molded into a semi-product of the rubber liner. Sand is filled in the semi-product. The sand is tamped and heated so that it is hardened and molded. A reinforcement element in the form of a wire or tape is wound around the semi-product. Two semi-products are brought into contact with each other. An un-vulcanized rubber band is provided around and attached to the semi-products. The rubber liners and the reinforcement elements are heated and vulcanized with composite resin. Finally, the water soluble sand mold is dissolved and removed so that the final product of the rubber liner is made, and so is the composite pressure vessel.

12 Claims, 11 Drawing Sheets

METHOD OF MANUFACTURING RUBBER LINED COMPOSITE PRESSURE VESSELS

BACKGROUND OF INVENTION

1. Field of Invention

The present invention relates to a composite pressure vessel and, more particularly, to a method for making a rubber liner of a composite pressure vessel.

2. Related Prior Art

To make a composite pressure vessel with a rubber liner, two conventional methods are applied. In the first method, water-soluble adhesive being dissolved in water and alcohol, is mixed with sand at a predetermined ratio. The mixture is poured into a mold and made compact. The mixture is baked and cured to form a sand mold. The profile of the sand mold is lathed before it is coated with release paper. Then, a vacuum-bag process, a hand layup method or a filament winding method is executed to provide a composite on the release paper. The sand mold is dissolved in water and removed before rubber is poured onto the composite while the composite is rotated so that the rubber is vulcanized and molded at the room temperature.

In the second method, a sand mold is made and lathed before it is coated with release paper. Rubber sheet are laminated on the release paper before it is heated, pressed and molded in an autoclave. Then, the molded rubber sheet is lathed and turned into a rubber liner. Then, a vacuum-bag process, a hand layup method or a filament winding method is executed to provide a composite on the rubber liner before it is baked and cured. Finally, the sand mold is dissolved in water and removed. Thus, a composite pressure vessel is provided with a rubber liner.

In both of the conventional methods, the filament must be wound along a predetermined path to provide a designated strength to enable the composite pressure vessel to stand a designed value of pressure. In addition, to provide a precise size, the sand mold or the molded rubber must be lathed precisely, and this takes a lot of time and costs a lot of money. Moreover, the sand mold is dissolved in water and removed, and this is a waste. In the first conventional method, the thickness of the rubber liner is uneven because the rubber is poured onto the composite and vulcanized while the composite is spun The present invention is therefore intended to obviate or at least alleviate the problems encountered in prior art.

SUMMARY OF INVENTION

It is the primary objective of the present invention to provide a method for making a composite pressure vessel with rubber liner.

To achieve the foregoing objective, the method includes the step of providing a mold with a ring, the step of providing rubber sheets with an annular flange in the mold so that an annular flange of the rubber sheets are located on the ring, the step of providing tapes for attaching the annular flange to the ring, the step of providing a metal socket in an aperture defined in the rubber sheet, the step of providing a metal cap for covering the metal socket, the step of providing a vacuum bag for enclosing the rubber sheets and the mold, the step of heating, pressing and vulcanizing the rubber sheets, the step of removing the vacuum sheet and the metal cap to provide a semi-product of the rubber liner, the step of inserting a rod in the semi-product, the step of filling sand in the semi-product, the step of curing the sand mold, the step of removing the rod, the step of cutting the annular flange, the step of assembling the semi-product against another semi-product, the step of providing rubber solvent on portions of the semi-product that are located against each other, the step of providing a rubber band on the rubber solvent so that the semi-products are joined together, the step of inserting a mandrel in the semi-product assembly, the step of winding a filament with resin on the semi-product assembly, the step of heating and hence vulcanizing the rubber band and curing the resin simultaneously to make the composite pressure vessel, the step of removing the mandrel; the step of dissolving the sand mold embedded in the composite pressure vessel in water and hence removing the sand mold.

The mold may include a cylindrical section and at least a tapered section.

The mold may be made of metal or nonmetal.

The rubber sheets may be made of silicone rubber, natural rubber, fluorocarbon rubber, chloroprene rubber, poly-butadiene rubber, nitrile butadiene rubber, hyperion rubber or ethylene propylene diene monomer.

The metal socket is adhered to the rubber sheet so that the metal socket and the rubber sheet together form a stepped structure.

The method may further include the step of providing rubber-coupling agent between the rubber sheet and the metal socket.

The sand mold may be water soluble sand mold.

The method may further include the step of removing the rod from the semi-product before the step of assembling the semi-products against each other and the step of inserting a mandrel in the metal sockets.

The filament may be a glass fiber, a carbon fiber, an aramid fiber, a synthetic or natural fiber, and any combination thereof.

The method may further include the step of providing resin for soaking the filament before the step of winding the filament on the semi-products. The resin may be epoxy, polyester, vinylester, polybutadiene, or any synthetic resin.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
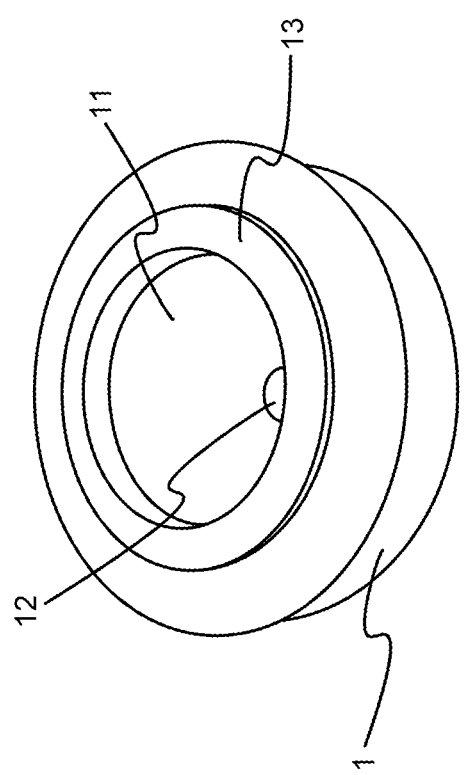
FIG. 1 is a perspective view of a mold used in a method for making a composite pressure vessel according to the preferred embodiment of the present invention.

Referring to the drawings, there is described a method for making a composite pressure vessel according to the preferred embodiment of the present invention. Referring to FIG. 1, there is provided a mold 1 used in the method for making a composite pressure vessel according to the preferred embodiment of the present invention. The mold 1 is formed with a cylindrical section 11 and at least a tapered section 12. An opening is defined in the cylindrical section 11 of the mold 1. An aperture is defined in the tapered section 12 of the mold 1. The diameter of the aperture is smaller than the diameter of the opening. A ring 13 is formed or located on the mold 1 near the opening. The mold 1 may be made of metal or non-metal. The size of the mold 1 is determined by the size of a composite pressure vessel to be made.

Figure 2:
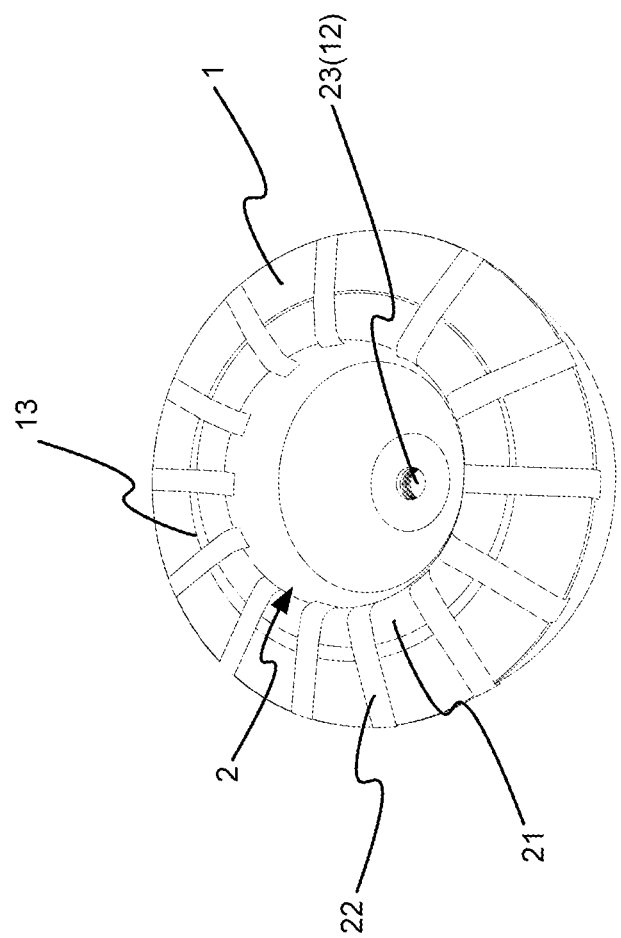
FIG. 2 is a perspective view of a metal socket inserted in a rubber sheet located in the mold shown in FIG. 1.

Referring to FIG. 2, a rubber sheet 2 is located in the mold 1. The rubber sheet 2 includes an annular flange 21 supported on the ring 13. Tapes 22 are used to attach the annular flange 21 to the ring 13, thus retaining the rubber sheet 2 in the mold 1. The rubber sheet 2 is made of silicone rubber, natural rubber, fluorocarbon rubber, chloroprene rubber, poly-butadiene rubber, nitrile butadiene rubber, hyperion rubber or ethylene propylene diene monomer or any combination thereof.

A metal socket 23 is inserted in the aperture defined in the tapered section 12 of the mold 1. Rubber-coupling agent is provided between the metal socket 23 and the rubber sheet 2 so that the metal socket 23 is attached to the rubber sheet 2. The metal socket 23 and the rubber sheet 2 together form a stepped structure.

Figure 3:
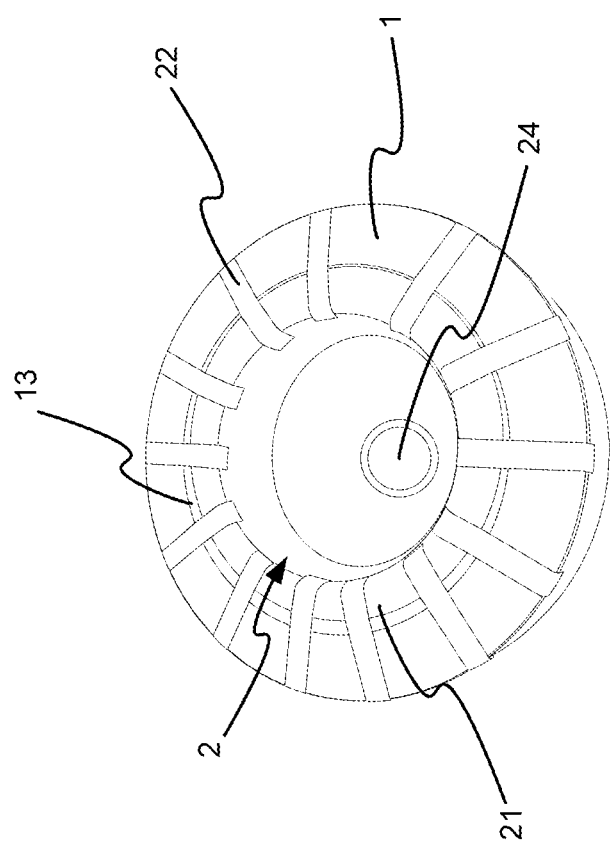
FIG. 3 is a perspective view of a metal cap for covering the metal socket located in the rubber sheet shown in FIG. 2.

Referring FIG. 3, a metal cap 24 is located on the metal socket 23 so that the top of the metal cap 24 is located higher than the internal side of the mold 1 in the tapered section 12.

Figure 4:
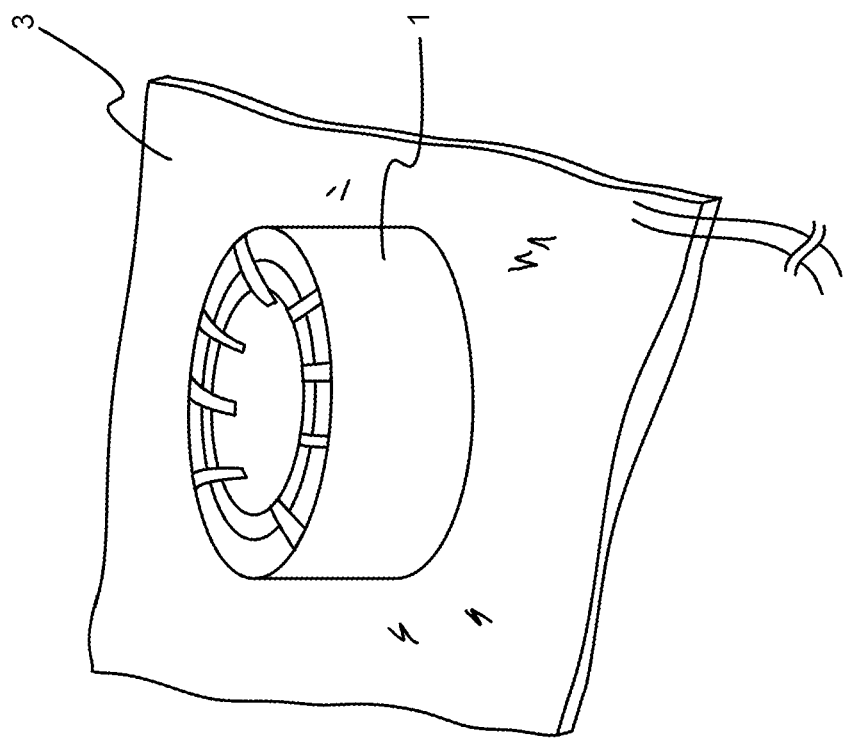
FIG. 4 is a perspective view of a vacuum bag for enclosing the metal cap and the rubber sheet shown in FIG. 3.

Referring to FIG. 4, the mold 1, the rubber sheet 2, the metal socket 23 and the metal cap 24 are located in a vacuum bag 3. The rubber sheet 2 is heated, pressed and vulcanized so that it is turned into a semi-product 2a of a rubber liner of the composite pressure vessel. After the vulcanization, the vacuum bag 3 and the metal cap 24 are removed.

Figure 5:
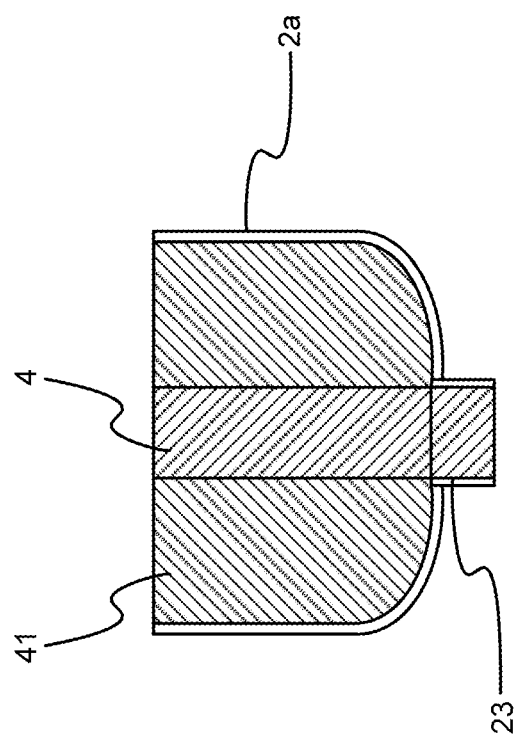
FIG. 5 is a cross-sectional view of a metal rod inserted in the metal socket located in the rubber sheet shown in FIG. 2.

Referring to FIG. 5, a metal rod 4 is inserted in the metal socket 23 located in the aperture defined in the tapered section 12 of the semi-product 2a of the rubber liner. Soluble sand 41 is filled in the semi-product 2a of the rubber liner. The soluble sand 41 is hammered and made compact. The soluble sand 41 is dried. Thus, the soluble sand 41 is turned into a sand mold 41. The soluble sand mold 41 is still kept out of the aperture defined in the metal socket 23 after the metal rod 4 is removed from the metal socket 23. The, the annular flange 24 is cut.

Figure 6:
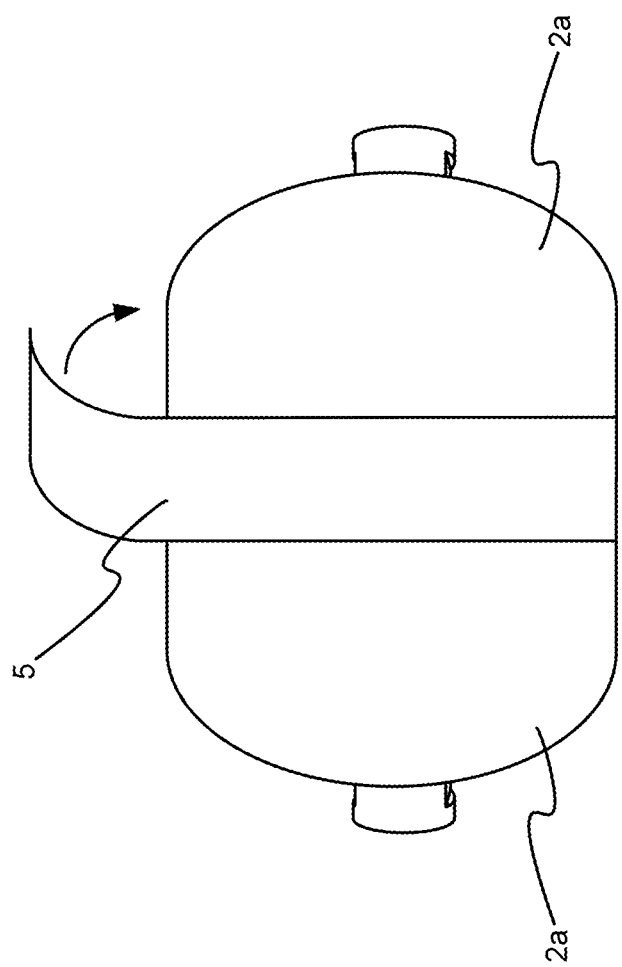
FIG. 6 is a side view of a rubber band for interconnecting two semi-products as the one shown in FIG. 2.
Figure 7:
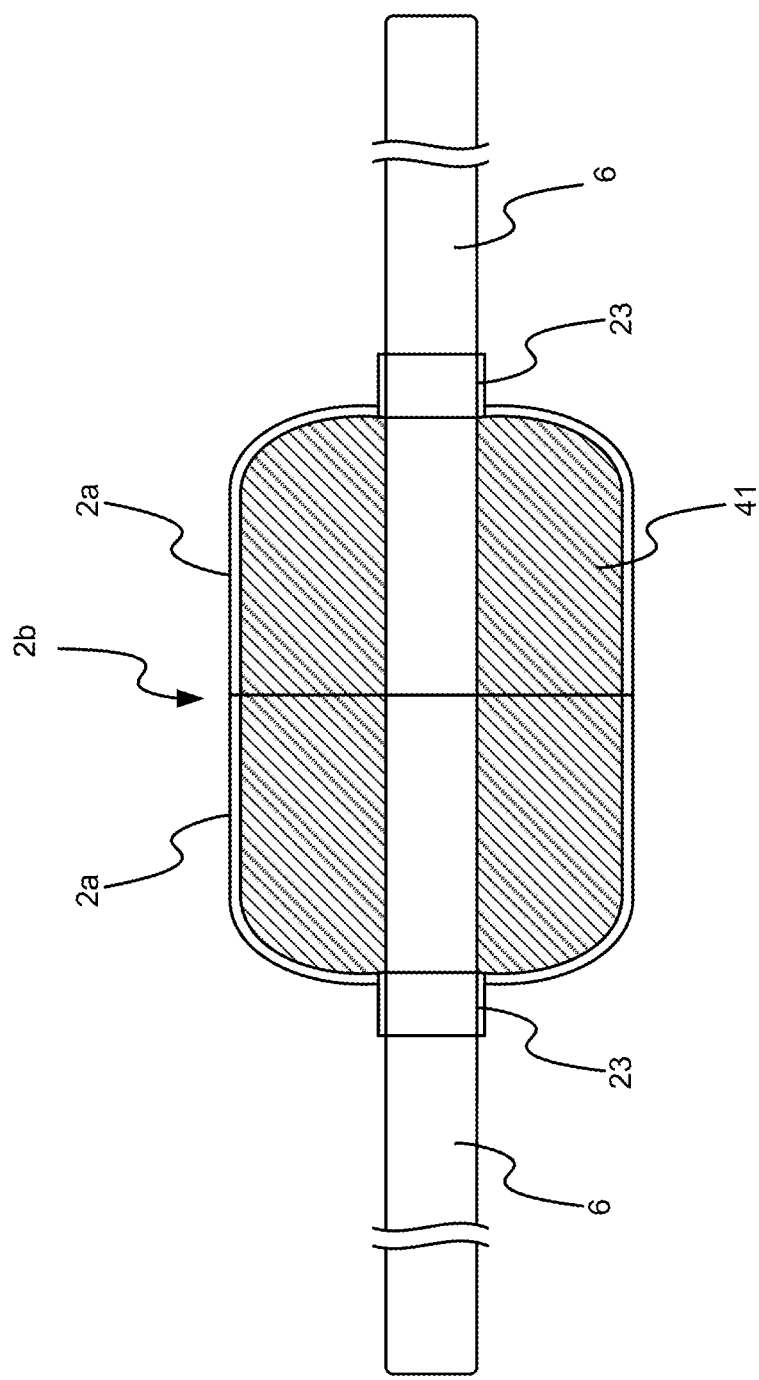
FIG. 7 is a cross-sectional view of a mandrel inserted in the rubber sheets shown in FIG. 6.

Referring to FIGS. 6 and 7, two semi-products 2a are located against each other to form a semi-products assembly 2b, with the cylindrical sections 11 thereof assembled against each other. A mandrel 6 is driven in a hole defined in each of the metal sockets 23 and the metal sockets 23 are locked to the mandrel 6, thus keeping the semi-products 2a against each other. Preferably, the mandrel 6 is a screw, and the hole defined in each of the metal sockets 23 is a screw hole. A rubber band 5 is wound around the semi-products 2a so that the semi-products 2a are still connected to each other.

Figure 8:
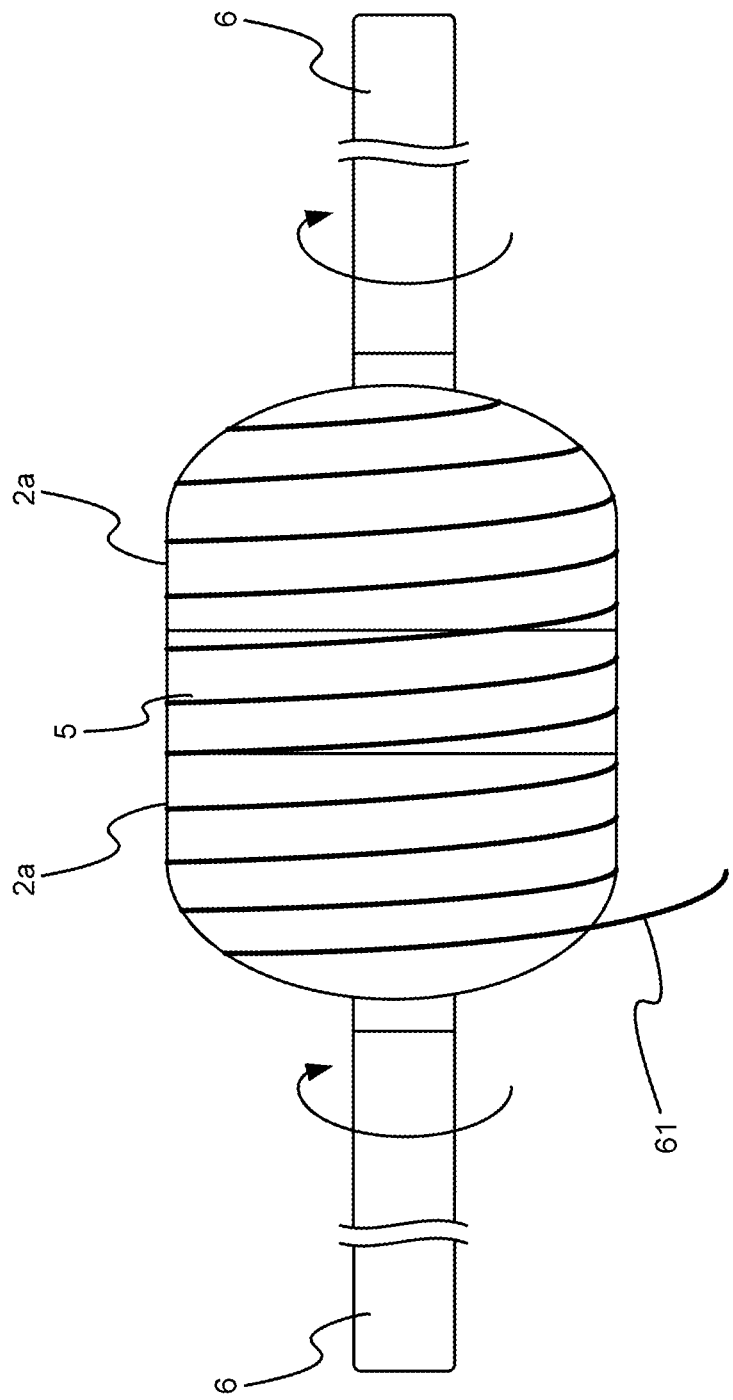
FIG. 8 is a side view of a filament wound around the rubber sheets shown in FIG. 7.
Figure 9:
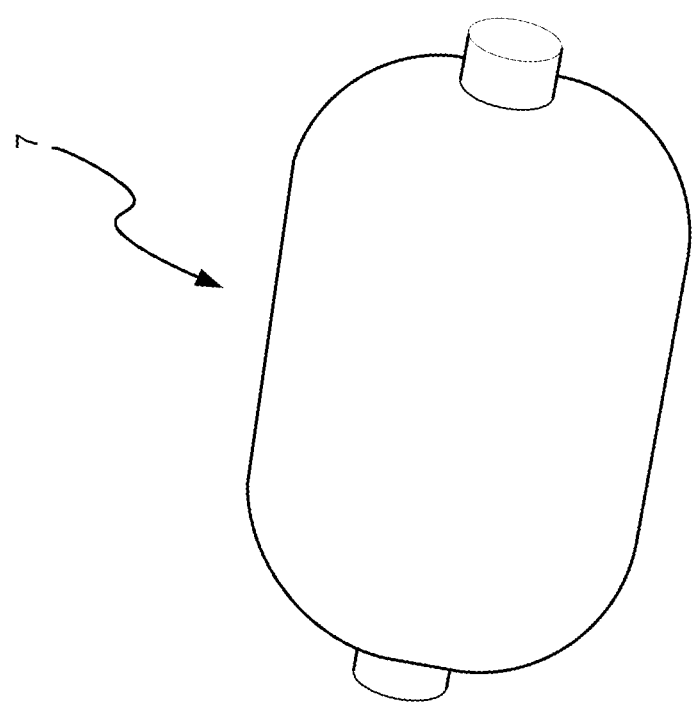
FIG. 9 is a perspective view of a composite pressure vessel after filament wound shown in FIG. 8.

Referring to FIGS. 8 and 9, the mandrel 6 is used for spinning the semi-products 2a. A filament 61 is soaked in resin. Then, the filament 61 is wound on the semi-products 2a and the rubber band 5 assembly when the semi-products 2a and the rubber band 5 are spun as well as the mandrel 6. The semi-products 2a and the filament 61 form an uncured composite pressure vessel 7. The filament may be a glass fiber, a carbon fiber, an aramid fiber, a synthetic or natural fiber, or a combination thereof. The resin may be epoxy, polyester or vinylester, polybutadiene, or any synthetic resin.

Figure 10:
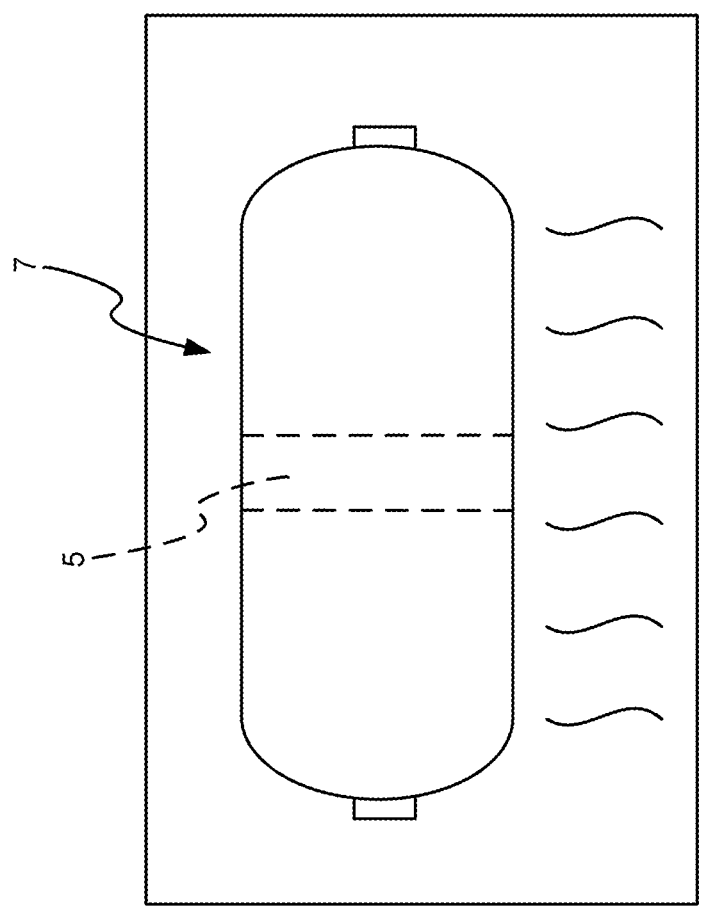
FIG. 10 is a side view of the composite pressure vessel cured in the oven shown in FIG. 9.

Referring to FIG. 10, the uncured composite pressure vessel 7 is heated. Thus, the rubber 5 is vulcanized and the resin is cured. That is, the composite pressure vessel 7 is molded and the mandrel 6 is removed.

Figure 11:
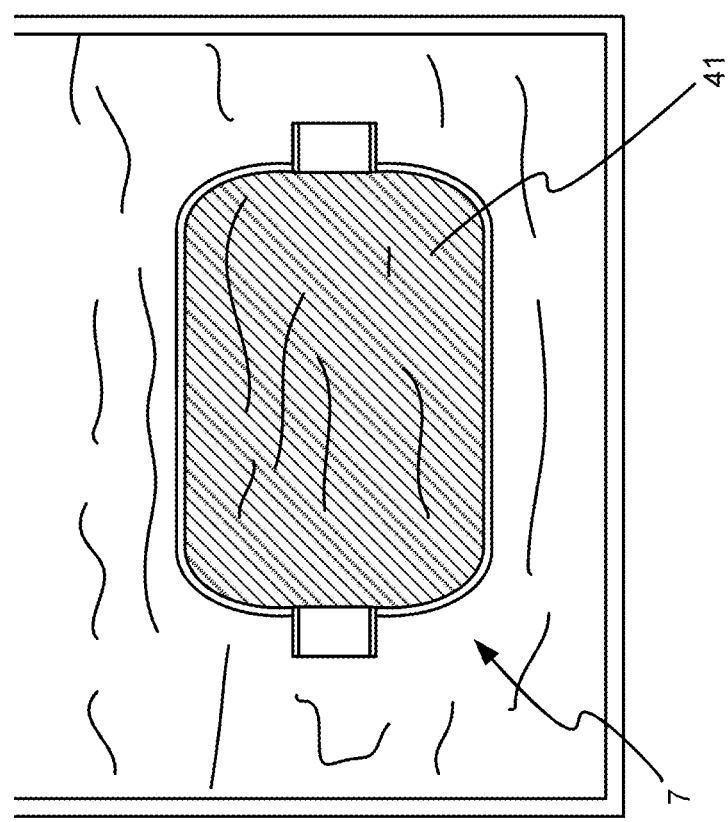
FIG. 11 is a cross-sectional view of the composite pressure vessel dissolved in the water shown in FIG. 10.

Referring to FIG. 11, the composite pressure vessel 7 is soaked in water so that the soluble sand mold 41 is dissolved in the water and removed from the composite pressure vessel 7.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method of manufacturing rubber lined composite pressure vessels, the method including the steps of:
    providing a mold (1) with a ring (13);
    providing a rubber sheet (2) with an annular flange (21) in the mold (1) so that an annular flange (21) of the rubber sheet (2) is located on the ring (13);
    providing tapes (22) for attaching the annular flange (21) to the ring (13);
    inserting a metal socket (23) in an aperture defined in the rubber sheet (2);
    providing a metal cap (24) for covering the metal socket (23);
    providing a vacuum bag (3) for enclosing the rubber sheet (2) and the mold (1);
    heating, pressing and therefore vulcanizing the rubber sheet (2);
    removing the vacuum sheet and the metal cap (24), thus providing a semi-product of the rubber liner;
    inserting a rod (4) in the semi-product (2a);
    providing a sand mold (41) in the semi-product (2a) by filling sand (41) in the semi-product (2a), making the sand (41) compact, and drying the sand (41);
    removing the rod (4);
    cutting the annular flange (21);
    assembling the semi-product (2a) against a second semi-product (2a);
    providing rubber solvent on portions of each of the two semi-products (2a) that are located against each other;
    providing a rubber band (5) on the rubber solvent so that the two semi-products (2a) are joined together forming a semi-products assembly (2b);
    inserting a mandrel (6) in the semi-products assembly (2b);
    winding a filament (61) on the semi-products assembly (2b);
    heating and hence vulcanizing the rubber band (5) and curing the filament (61); then removing the mandrel, and dissolving the sand mold (41) in water and hence removing the sand mold (41).

2. The method according to claim 1,
    wherein the mold (1) includes a cylindrical section (11) and at least a tapered section (12).

3. The method according to claim 1,
    wherein the mold (1) is made of metal.

4. The method according to claim 1,
wherein the mold (1) is made of nonmetal.

5. The method according to claim 1,
wherein the rubber sheet (2) is made of at least one material selected from the group consisting of silicone rubber, natural rubber, fluorocarbon rubber, chloroprene rubber, poly-butadiene rubber, nitrile butadiene rubber, hyperion rubber and ethylene propylene diene monomer.

6. The method according to claim 1,
wherein the metal socket (23) is adhered to the rubber sheet (2) so that the metal socket (23) and the rubber sheet (2) together form a stepped structure.

7. The method according to claim 1,
further including the step of providing rubber-coupling agent between the rubber sheet (2) and the metal socket (23).

8. The method according to claim 1,
wherein the sand mold (41) is soluble sand mold.

9. The method according to claim 1,
further including the steps of:
removing the rods (4) from the semi-products assembly (2*b*) before the step of assembling each of the semi-products (2*a*) against each other, inserting a mandrel (6) in the metal sockets (23).

10. The method according to claim 1,
wherein the filament (61) is selected from the group consisting of a glass fiber, a carbon fiber, an aramid fiber, a synthetic or natural fiber, and any combination thereof.

11. The method according to claim 1,
further including the step of providing resin for soaking the filament (61) before the step of winding the filament (61) on the semi-products assembly (2*b*).

12. The method according to claim 10,
wherein the resin is selected from the group consisting of epoxy, polyester and vinylester, polybutadiene, or any synthetic resin.

* * * * *